US011346774B2

(12) United States Patent
Weidmann

(10) Patent No.: US 11,346,774 B2
(45) Date of Patent: May 31, 2022

(54) INFRA RED SPECTROMETER

(71) Applicant: United Kingdom Research and Innovation, Swindon (GB)

(72) Inventor: Damien Weidmann, Didcot (GB)

(73) Assignee: UNITED KINGDOM RESEARCH AND INNOVATION, Swindon (GB)

( * ) Notice: Subject to any disclaimer, the term of this patent is extended or adjusted under 35 U.S.C. 154(b) by 1 day.

(21) Appl. No.: 16/344,183

(22) PCT Filed: Oct. 27, 2017

(86) PCT No.: PCT/GB2017/053244
§ 371 (c)(1),
(2) Date: Apr. 23, 2019

(87) PCT Pub. No.: WO2018/078384
PCT Pub. Date: May 3, 2018

(65) Prior Publication Data
US 2019/0317013 A1    Oct. 17, 2019

(30) Foreign Application Priority Data

Oct. 27, 2016  (GB) ...................................... 1618182

(51) Int. Cl.
| G01N 21/3504 | (2014.01) |
| G01J 3/08 | (2006.01) |
| G01J 3/42 | (2006.01) |
| G01N 21/27 | (2006.01) |

(52) U.S. Cl.
CPC ............ *G01N 21/3504* (2013.01); *G01J 3/08* (2013.01); *G01J 3/42* (2013.01); *G01N 21/276* (2013.01); *G01J 2003/423* (2013.01)

(58) Field of Classification Search
None
See application file for complete search history.

(56) References Cited

U.S. PATENT DOCUMENTS

| 4,929,078 A | 5/1990 | Harmon |
| 5,223,715 A | 6/1993 | Taylor |
| 5,747,809 A * | 5/1998 | Eckstrom ........... G01N 21/3504 |
| | | 250/339.13 |
| 6,800,855 B1 | 10/2004 | Dong et al. |

(Continued)

FOREIGN PATENT DOCUMENTS

| CN | 105277503 B | 1/2016 |
| DE | 3106331 | 9/1982 |

(Continued)

OTHER PUBLICATIONS

International Search Report and Written Opinion of PCT/GB2017/053244 dated Jan. 25, 2018, 10 pp.

(Continued)

*Primary Examiner* — Edwin C Gunberg
(74) *Attorney, Agent, or Firm* — Lathrop GPM LLP

(57) ABSTRACT

Methods and apparatus are disclosed for detecting one or more species in a sample, wherein laser probe light is frequency swept across at least one infra red absorption spectrum feature of each of the species. A path from the probe light source to a single detector element may be switched between at least one sample absorption cell or volume and one or more reference cells or volumes.

22 Claims, 2 Drawing Sheets

(56) References Cited

U.S. PATENT DOCUMENTS 6,888,127 B2  5/2005 Jones et al.
2008/0315102 A1  12/2008 Weidman

FOREIGN PATENT DOCUMENTS

| JP | 2002286638 | 10/2002 |
| JP | 2005224530 | 8/2005 |
| WO | WO 97/47957 | 12/1997 |
| WO | WO2009101374 | 8/2009 |
| WO | WO 2011/058330 A1 | 5/2011 |
| WO | WO 2014/029971 A1 | 2/2014 |
| WO | WO2016063918 | 4/2016 |

OTHER PUBLICATIONS

GB Patent Application No. 1618182.8, Search Report dated Mar. 8, 2017, 1 page.
Nelson et al. (2008) "New method for isotopic ratio measurements of atmospheric carbon dioxide using a 4.3μm pulsed quantum cascade laser" Appl. Phys. B, 90, pp. 301-309.

\* cited by examiner

INFRA RED SPECTROMETER

The present invention relates to methods and apparatus for detecting one or more species in a sample, for example using infra red absorption spectroscopy. For example, embodiments of the invention may operate by switching a path from a probe light source to a single detector element between a sample absorption cell or volume and one or more reference absorption cells or volumes.

INTRODUCTION

Infra red absorption spectroscopy is used for a wide variety of purposes in which it is required to determine concentrations of one or more species in a sample such as a gas. Such applications include the detection of atmospheric gas components for example in pollution and geophysical monitoring, the detection of isotopologues of carbon dioxide in clinical breath analysis, in industrial process control, and many other areas.

Spectrometers adapted for such purposes encounter challenges in terms of drift of the laser source and detection components, and low frequency noise in electronics systems for example common noise arising in the signal path from the detectors to analogue to digital converters. It would therefore be desirable to provide spectrometer apparatus and corresponding methods which address such issues.

SUMMARY OF THE INVENTION

Embodiments of the invention provide methods and apparatus which enable quasi real-time simultaneous molecular detection of multiple absorption volumes without the need for a separate detector element for each or multiple absorption volume channels, offering a capability that is not possible with current state of the art laser based spectrometers. This can significantly reduce technical complexity associated with controlling and adjusting responsivity of multiple detector elements, reduces biases and uncertainties associated with the differences in detector and optical system responses, and reduces cost and complexity in the overall spectrometer design. The invention is particularly advantageous in situations where simultaneous detection of multiple molecular species is required wherein the molecular detection is covered within the detection dynamic range of the single detector element.

In some embodiments of such spectrometers, a first absorption volume could contain a gaseous or other fluid sample, an optional second absorption volume could contain a gas mixture that is inert to the tuning range of a laser source used to interrogate the absorption volumes (for example only nitrogen) for use as a baseline measurement, and one or more further absorption volumes could then contain respective calibration gases of different known concentrations. These kinds of arrangements enable quasi real time baseline cancelation and permanent multi-point on board concentration calibration of the spectrometer.

The invention offers advantages in established technologies used for laser spectroscopic chemical sensing such as Tunable Diode Laser Absorption Spectroscopy (TDLAS), frequency modulation spectroscopy, Chirped Laser Dispersion Spectroscopy, and wavelength modulation spectroscopy.

According to some aspects, the invention therefore provides a method of detecting one or more target species in a sample, typically a gas sample, the method comprising: generating probe light using one or more laser sources such that the probe light completes one or more frequency sweeps across at least one spectral feature of each of the one or more species. Typically, each spectral feature is an infra red absorption feature such as an absorption peak or line. A plurality of absorption volumes is provided, including a sample volume containing said sample, and one or more reference volumes containing known concentrations of reference species, typically but not necessarily provided by the same one or more target species, where the known concentrations may be zero in one or more reference volumes to provide a baseline reference. Reference volumes may typically be provided using enclosed reference cells containing the relevant reference species. Sample volumes may be provided by enclosed sample cells, or could be provided using open path volumes, for example a non enclosed volume external to the instrument, for example through the open atmosphere, within a building, adjacent to a chimney stack, along a conduit such as pipeline, or similar.

The probe light is directed along an optical path to a single detector element which outputs a detector signal representative of the intensity of the incident probe light. The complete optical path from the laser source(s) to the single detection element passes through only one of the absorption volumes at any one time, but the method includes switching the path to the single detection element so as to sequentially select each of the absorption volumes a plurality of times during each frequency sweep, so that the detector signal comprises a sample segment each time the optical path comprises the sample volume, and a reference segment each time the path comprises a reference volume. The one or more target species are then detected from the sample segments of the detector signal, but this detection includes a process of calibration using the reference segments. This could be by direct calibration or normalisation of the sample segments of the detector signal using corresponding reference segments, or the calibration could be included more generally as part of the processing of the sample segments to carry out the detection process, for example as part of a model fitting process or as part of a calibration of end results of determining target species concentration.

The one or more target species may comprise at least two species, i.e. first and second species in the sample, and the step of detecting may then comprises detecting from the sample segments at least a first spectral feature of the first species and at least a second spectral feature of the second species. The concentrations of both the first and second species, calibrated against known concentrations of the at least two species in each of the one or more reference volumes, may therefore be determined from the detector signal output by the single detector element.

In some embodiments, the first and second target species may be isotopologues of the same molecule, and the step of determining concentrations of the at least two species may then comprises determining an isotopic ratio of the two species. However, a wide variety of other kinds of target species and concentration results may be determined.

The step of detecting one or more species from the sample segments may comprise calibrating sample segments from a particular frequency sweep using only reference segments from the same frequency sweep. In this way, the reference segments used to calibrate particular sample segments are subject to common factors of drift and noise in the spectrometer, at least at frequencies of such drift and noise which do not exceed the repetition rate of the path switching to the sample volume. To this end, the step of detecting may calibrate sample segments using only those reference segments which are proximal or adjacent in time within the detector signal to the sample segment to be calibrated.

The at least one reference absorption volume may comprise two or more reference absorption volumes, each reference volume containing a known concentration of at least one of the target species (which may be a zero concentration). If each reference volume contains a known concentration which is different to the known concentration of that species in each of the other reference volumes then these reference volumes can be used to provide a linear or non-linear interpolation between and/or an extrapolation from the detector signal from each of the reference volumes for use in calibrating the detector signal from the sample volume.

In order to reduce drift and noise differences between the sample volume and reference volume parts of the detector signal, the path may be switched such that the sample volume is selected at a repetition rate of at least 50 Hz, and more typically around 1 kHz or more, for example at around 10 kHz. Typically, each reference volume may be switched at the same repetition rate as the sample volume. In some embodiments each reference volume may be selected once for each selection of the sample volume, and in the same order of selection for each frequency sweep of the laser source(s), but different duty cycles and orders may be used if required.

A single frequency sweep may be substantially monotonic in frequency (or equivalently in wavelength or wavenumber), and the frequency may change continuously, or may be stepped if required. Typically, one frequency sweep will pass each target absorption feature a single time.

Although the discussion above relates primarily to a spectrometer and method in which a single sample absorption volume is provided, a plurality of sample volumes may instead be provided, for example each containing a different sample. Sample segments within the detector signal from the single detector would then comprise sample segments from each of the different sample volumes. The same or different target species may then be detected in each of the different sample volumes, using the relevant sample segments, including calibration using relevant reference segments. The same or different reference segments and/or reference volumes may be used for calibrating the signal from each of the different sample volumes.

The invention also provides apparatus corresponding to the above methods, including a spectrometer arranged to carry out the methods. Such spectrometers can be constructed using either free standing optics, fiber coupled systems, or a combination of the two, and the choice of switching mechanism and beam path splitting & combining is likely to depend on whether the system is an optically free standing or fiber coupled arrangement. The switching can be implemented for example by acoustic-optical systems, (micro) electro-mechanical devices, electro-optical beam-steering, and other arrangements. The optical switching can occur prior to the beam passing through the absorption volumes or afterwards.

Multiple lasers may be used to provide the one or more laser sources. However, the laser wavelength range used for the full frequency sweep from all the laser sources, at least so as to cover the infra red absorption spectrum features, should then be within the dynamic spectral range of the detector element. A typical laser frequency sweep for use in embodiments of the invention may typically cover a frequency range of about 0.1 to about 10 wavenumbers in the infra red, and an extended range may be obtained by using two or more laser sources each covering a different frequency range. These frequency ranges may be contiguous, overlapping or separated as required to cover the relevant spectral features.

Using these arrangements, the detector signal delivered by the detector element is made of a temporal succession of peaks, or segments, resulting from the path switching into the different absorption volumes. In the case of a N-channel system, a group of N segments is then produced approximately for one laser frequency, although if the laser frequency sweep is continuous there will be slight variations in probe light frequency between the different segments of a single group.

Analysis of the detector signal may involve a metric scaling of an individual spectral feature such as an absorption peak, such as peak power, or some form of peak area, or alternatively phase detection mechanisms may be used to extract characteristics of spectral features.

Embodiments of the invention provide a variety of advantages and benefits. Quasi real time simultaneous molecular detection in multiple absorption volumes using only a single detector element is provided, which addresses the various technical limitations and challenges associated with the use of multiple detectors associated with each absorption volume. For example, cancellation of noise within the frequency band from DC to the repetition rate of the path switching is achieved, along with calibration cancellation of drifts from laser power variations and other sources of common noise. Cancellation of drifts and biases produced by the detector responsivity and associated electronics such as any preamplifier and similar may also be achieved. Due to the fast rate of the optical path switching, noise and other imbalances that occur can be cancelled out in quasi real time in a configuration where a sample containing target species is placed in one channel and comparative or zero references are provided in the other channels. Significantly improved drift and stability of measurement is made possible by continuous real-time calibration using multiple absorption volumes.

Embodiments of the invention are suitable for use in applications where high accuracy, low drift & measurement stability is desirable. This may be enabled by the use of multiple absorption volume channels as reference volumes containing species of known concentrations, and/or optionally a zero channel absorption volume (for example containing only nitrogen) acting as a baseline. Examples of where this is important include trace gas analysis and stable isotope analysis for use in oil and gas analysis, power generation, and medical diagnosis such as breath analysis. The invention provides an advantage in situations where multiple sample inlets are required to be analysed simultaneously in quasi real time. This is often the case in process analytical applications, where molecular detection is often required at various points within a process. In this configuration, one instrument will be sufficient as opposed to multiple instruments placed at different points.

BRIEF SUMMARY OF THE DRAWINGS

Embodiments of the invention will now be provided, by way of example only, with reference to the accompany drawings of which.

DETAILED DESCRIPTION OF EMBODIMENTS

Figure 1:
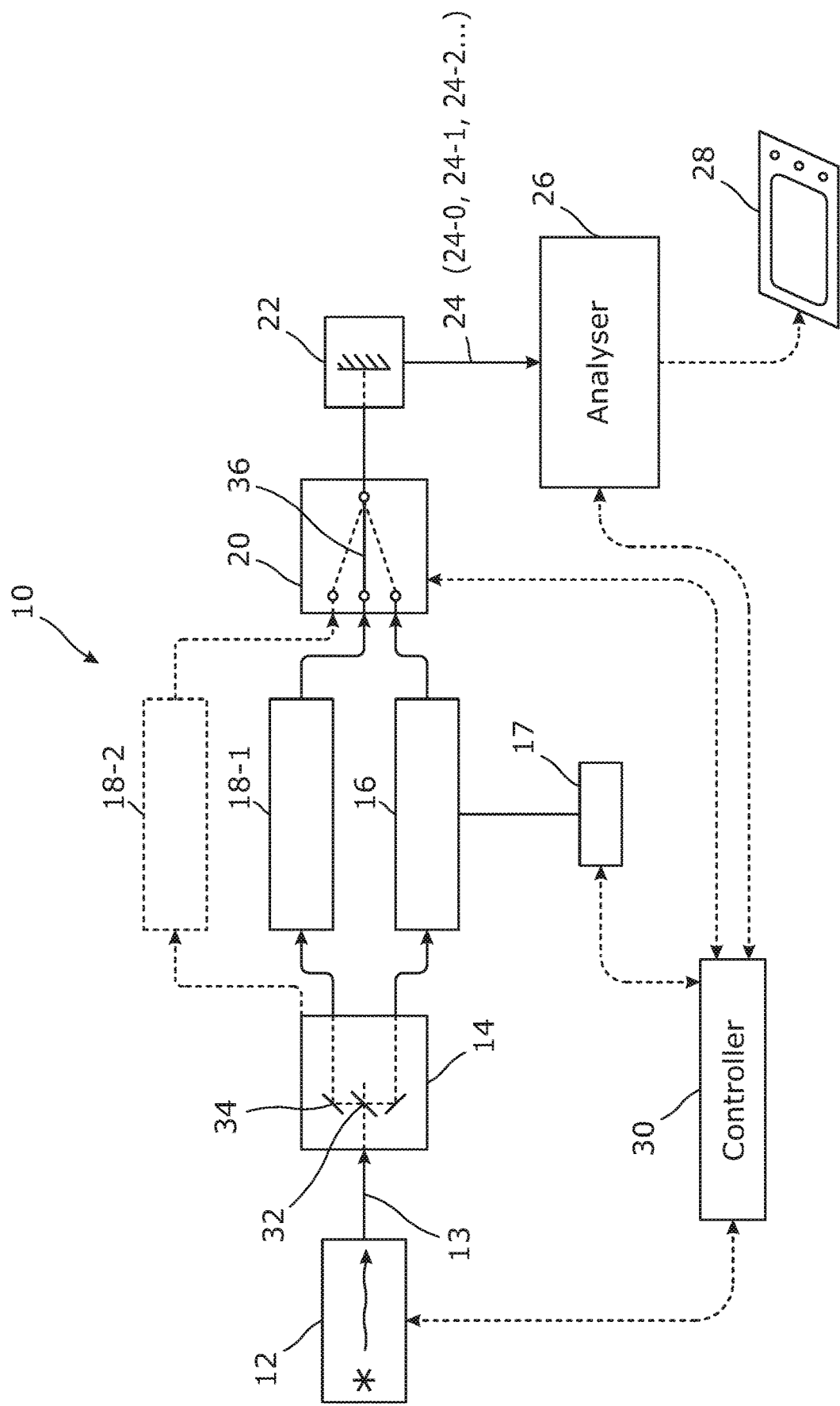
FIG. 1 depicts an infra red absorption spectrometer according to the invention.

Referring now to FIG. 1 there is shown a spectrometer 10 for detecting one or more species in a sample, typically a sample of gas or other fluid. More particularly, the spectrometer may be for determining concentrations of one or more species, or relative concentrations such as concentration ratios between two or more species in the sample, although the spectrometer may be used to detect other properties of the sample such as temperature, pressure, flow rate, and so forth. The spectrometer may for example be used to detect different isotopes, or isotopologues or isotopomers of a molecule, such as the isotopologues $^{12}CO_2$ and $^{13}CO_2$, but a wide variety of other species may be detected and compared such as water, methane, ethane, hydrocarbons, nitrous oxide, NOx, SOx, ammonia, ozone, and halocarbons.

The spectrometer comprises one or more laser sources 12 operated to generate probe light 13 which is directed into one or more of multiple parallel absorption cells using first path optics 14. The parallel absorption cells include at least one sample absorption cell 16 containing the sample and one or more reference absorption cells 18-1 ... 18-$n$. After passing through one or more of the multiple absorption cells the probe light is routed to a single detector element 22 using second path optics 20. An electrical signal 24 representative of the intensity or power of the probe light arriving at the detector element 22, subject of course to the detection properties of the detector such as bandwidth and wavelength sensitivity, is directed to an analyser 26 which determines one or more properties of the sample in the sample cell from the electrical signal 24, such as detecting concentrations of the one or more species, including carrying out calibration of the determined properties using the one or more reference absorption cells. The determined properties, or other information derived from such properties may then be used in various ways for example by being displayed using a display element or device 28 which may or may not form part of the spectrometer 10.

As discussed above, although FIG. 1 depicts enclosed reference absorption cells, these may more generally be referred to as reference absorption volumes. Similarly, although FIG. 1 depicts an enclosed sample absorption cell 16, this may be more generally referred to as a sample absorption volume. Moreover, the absorption volumes, especially the sample absorption volume, need not be enclosed or in the form of a cell. For example, at least a part of the sample absorption volume may be provided by an open or free path, for example an optical path within a space through or open to the atmosphere. Such open path arrangements may be used for example to analyse the ambient atmosphere, including in specific locations such as adjacent to a chimney stack or road, along a conduit or pipeline, and so forth.

One or more of the absorption volumes may typically be constructed as absorption cells, for example using one or more sealed metal enclosures each with one or more optical windows relevant to the wavelength of probe light being used. Such an enclosure may also include a multi-pass arrangement using reflective surfaces to increase the path length within the enclosure. The introduction of the sample into the sample absorption volume or cell 16 may be controlled and arranged using a sample flow control 17, which may include one or more pumps, valves, filters, flow and/or pressure controllers and/or sensors, and so forth as required to obtain a suitable pressure and purity of the sample in the sample absorption volume or cell 16.

The one or more reference volumes 18-1 ... 18-$n$ contain known quantities or concentrations of the one or more species to be detected in the sample, whereby the known concentrations may range from zero to significantly above the maximum concentrations expected to be seen in the sample volume under normal use. Where just one reference volume is provided, concentrations of the one or more species may be similar to typical concentrations expected in the sample volume, so that the absorption signal is broadly similar between the reference and sample volumes. Where two or more reference volumes are provided, the concentrations of the one or more species in those reference volumes may be widely distributed across the expected range in the sample volume, so that an absorption signal from the sample volume can be calibrated against an interpolation between, or if necessary extrapolation from, absorption signals of known species concentrations in the two or more reference volumes.

The one or more absorption volumes may be provided with temperature control. Temperature stability is of particular importance in measuring concentrations of stable isotopes such as the relative concentration of $^{12}C$ and $^{13}C$. To control temperature of the volumes, each volume may be constructed to be of relatively low thermal mass and then coupled to a thermoelectric device for maintaining stability by feedback from a temperature detecting element, or may be of relatively high thermal mass to promote inherent thermal stability along with a highly accurate temperature measurement at the volume.

The laser source 12 may be a tunable laser such as a quantum cascade laser (QCL), an interband cascade laser, an optical parametric oscillator, or diode laser, any of which can be operated as a swept frequency source. The frequency sweep of the laser source 12 is controlled so as to cover at least one spectral feature of each of the one or more species. The spectral features may typically be infra red absorption lines, for example one infra red absorption line from each of two target species to be detected in the sample. If required, two or more laser sources 12 may be used together in the spectrometer, for example to cover a broader range of frequencies. Such multiple sources can be operated to probe the sample, and measure a larger set of molecules in the sample.

The single detector element 22 may typically be a single photodiode component, for example a single discrete device package, a single semiconductor substrate comprising one or more photodiode junctions or other photo sensitive structures working together as the single detector component, or a single photodiode junction or other photo sensitive structure working alone as the single detector component. The single detector element 22 should typically have a faster response time than a dwell time of the path switching between absorption volumes discussed below. Some different types of detector elements which could be used include photoconductor or photovoltaic photodiodes, bolometers, or any other kind of transducer providing an electrical signal related to the amount of light absorbed in the absorption volumes. A preamplifier may (not shown in FIG. 1) may be provided at the detector element itself, or in the analyser, and other electronics will typically also be provided as known to the person skilled in the art, usually in the analyser, such as detector signal conditioning electronics, and an analogue to digital converter.

The spectral extent of the frequency sweep required to cover the spectral features to be detected is effectively limited by the spectral dynamic range of the single detector element, which should therefore be selected accordingly. The detector element also needs to have a fast enough response and recovery time to temporally resolve the signal from each absorption volume at the speed of the path switching discussed below.

The first and second path optics 14, 20 are used to repeatedly switch the path of the probe light 13 from the one or more laser sources 12 to the single detector element 22 so that the path passes through each of the absorption volumes, one at a time. In other words the path optics 14, 20 sequentially and separately selects the absorption volumes. While a particular absorption volume is selected the electrical signal 24 from the detector element 22 is representative of only that absorption volume. In this way the electrical signal 24 can be considered to be made up of sample segments 24-0 representative of the sample volume 16, and reference segments 24-1 . . . 24-$n$ representative of each of the respective absorption volumes 18-1 . . . 18-$n$. The path is switched sufficiently quickly compared to the frequency sweep that each of the absorption volumes is selected a plurality of times during each frequency sweep, for example between about 30 and 1000 times.

As well as switching the path to each of the absorption volumes, the first and second path optics 14, 20 may be arranged to switch the path to one or more open paths which do not include any absorption volume. Such open paths may be used for example to provide calibration or stability monitoring data.

Either of both of the first and second path optics 14, 20 can be used to switch the path. In one arrangement, as shown in FIG. 1, the first path optics 14 comprises at least one or more beam splitters 32 and one or more suitable mirrors 34 arranged to direct the laser beam from laser source 12 into all of the absorption volumes 16, 18-1 . . . 18-$n$ at the same time. In this arrangement, the second path optics 20 then comprises at least one optical switch 36 arranged to select only one of the absorption volumes 16, 18 at any one time, and to direct the laser beam only from that absorption volume to the single detector element 22. However, the optical switch 36 could instead be located in the first path optics 14, and the beam splitter 32 instead located in the second path optics 20, or various other ways of achieving the required selection effect could be used, such as opto-acoustical beam deflection, or using optical fibre switches in a fibered optical layout.

FIG. 1 also shows a controller 30 which carries out functions such as controlling the one or more laser sources 12 to provide the desired shape and duration of the frequency sweep, control of the sample flow control 17, for example to initiate and stop sample flow into or through the sample absorption volume, set and/or detect a desired or target pressure of the sample in the volume, to control the first and/or second path optics 14, 20 to direct the correct sequencing and timing of the optical switch 36 and to pass information about that sequencing and timing to the analyser 26 so that the sample and reference segments of the electrical signal 24 from the single detector element 22 can be correctly identified and processed.

The path switching between absorption volumes is preferably carried out sufficiently quickly that each absorption volume is selected multiple times during one frequency sweep of the laser source. Typically, the selection may operate such that the absorption volumes are repeatedly selected in a particular order (for example the sample volume 16 followed by each of the one or more reference volumes 18-1 . . . 18-$n$ in a particular order), and such that each absorption volume is selected the same number of times (for example such that each absorption volume is selected exactly once in a cycle before the cycle is repeated), but if desired the order of selection of the absorption volumes may change, some particular absorption volumes may be selected more or less often than others, and so on. By switching the path sufficiently quickly, the spectrometer 10 is able to reduce the time between selecting the sample absorption volume 16, and selecting each of the reference absorption volumes which are used for calibrating the sample absorption volume signal. In this way, various adverse effects on the calibration process can be reduced or eliminated, such as drifts and variations in the sensitivity of the detector element 22, drift in performance of the laser source such as baseline frequency and slew rate in the frequency sweep, 1/f noise and other noise in the detector signal 24 and any amplifiers and other electronics in the analyser, drift and thermal noise in the absorption volumes and related optical paths, and so forth.

In some embodiments, the path may be switched so that the currently selected absorption volume is changed to a different volume at a switching rate of at least 100 Hz, or alternatively so that the sample volume 16 is reselected with a repetition rate of at least 100 Hz, with one or more reference volumes being selected between each selection of the sample volume. However other switching and repetition rates may be chosen in either of these scenarios, such as at least 50 Hz, at least 300 Hz, or at least 1 kHz.

To achieve a suitable switching action at such rates, various technologies may be used for the optical switch 36 or other element(s) used for this purpose such as acousto optical modulator switches, electro-mechanical switches which may be micro machined devices, electro-optical deflectors, or liquid crystal steering systems. For example, micro-electro-mechanical systems from Mirrorcle or Hamamatsu may be used.

Figure 2:
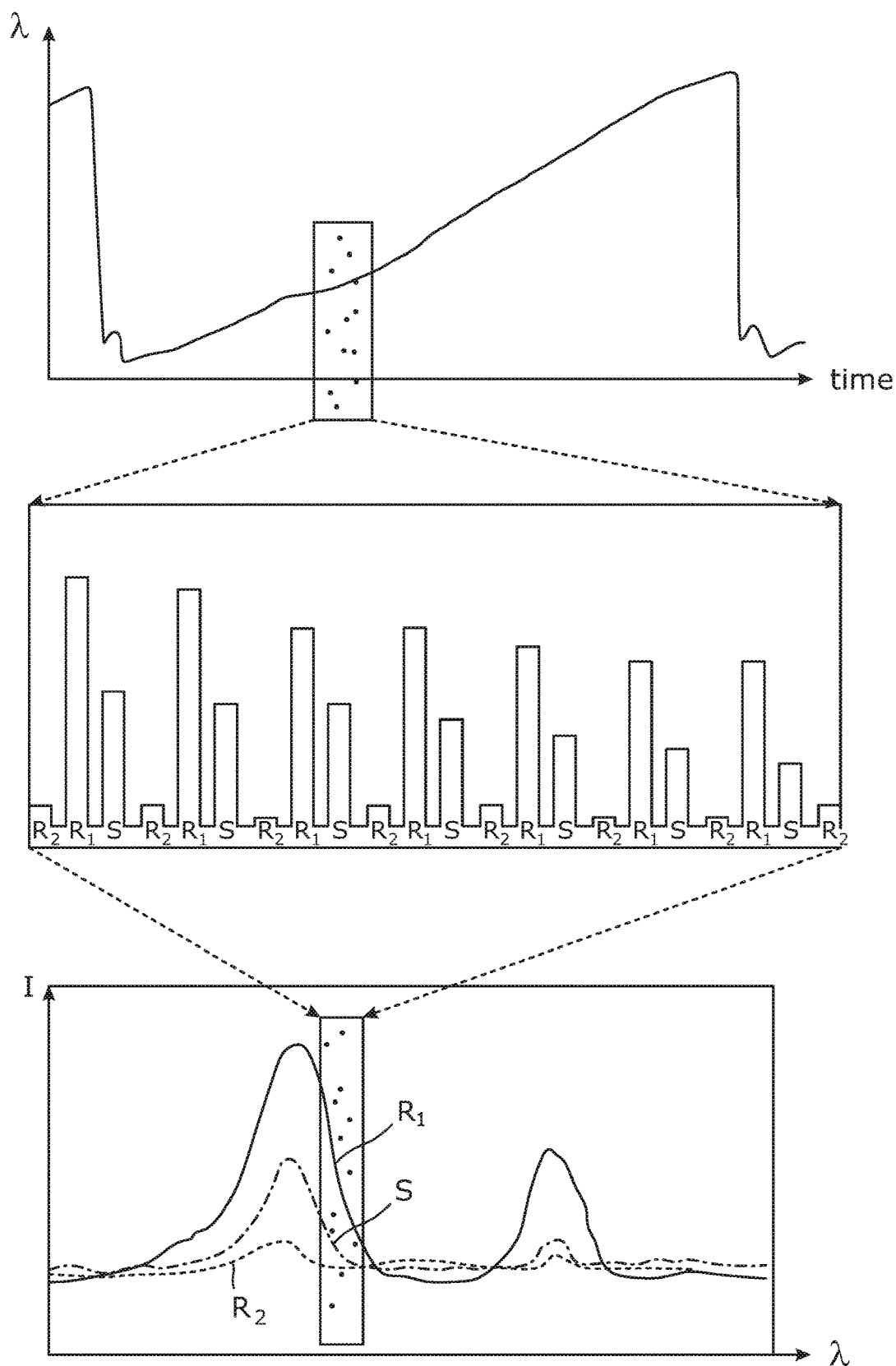
FIG. 2 depicts operational aspects of the spectrometer of FIG. 1, including in the top panel a frequency sweep of a laser source of the spectrometer, in the middle panel a series of sequential detector signal segments arising from an optical path to the detector passing through a sample volume and one or more reference volumes respectively, and in the lower panel absorption or transmission spectra determined from the detector signal segments.

Referring now to FIG. 2, the top panel illustrates a single frequency sweep of the laser source 12, plotted as wavelength of the probe light as a function of time. Typically a single sweep used in the present invention may have a duration of about 0.01 to about 10 seconds. In the case of a diode laser, a QCL or an ICL, tuning is typically adjusted by varying the injection current leading to heating and consequent thermal expansion of the laser cavity. In the case of a laser chip in an external cavity configuration being used in the laser source 12, the laser may typically be tuned by adjusting a tuning element such as by translating and/or rotating a grating. The shape and duration of the frequency sweep may be controlled by controller 30 illustrated in FIG. 1. Although the frequency sweep of FIG. 2 is shown as a monotonic ramp increasing in wavelength over time in an approximately straight line, the form of the frequency sweep may be varied widely as long as the certain parts of the frequency space required for analysis of the relevant spectra are sufficiently covered. For example, the frequency sweep may comprise continuous frequency changes, discrete frequency steps, or a combination of the two. If two or more lasers are used then the frequency sweep may comprise a separate ramp or other features for each of the lasers.

The middle panel of FIG. 2 is a plot of detector signal over the depicted interval of the time axis of the top panel of the figure, and illustrates how using the path optics 14, 20 to sequentially select each of the different absorption volumes 16, 18 gives rise to the detector signal comprising a plurality of sample segments S and a plurality of reference segments R1, R2 . . . , where the detector signal is comprises of a single series or sequence of such segments, with the detector signal comprising only one such segment at any one time. The panel shows an electrical current output by the single detector element 22 as the detector signal 24, with the segments of the signal corresponding to selection of each of the sample absorption volume as "S", and each of two active reference volumes as "R1" and "R2". In this figure, during the switching action between two absorption volumes the detector signal is shown to drop to a low but non zero level. The level and duration of any such switching feature in the detector signal 24 will depend on the control and properties of the optical switch 36 and on the properties of the detector element 22.

The rate of the optical switching may be chosen to satisfy particular design parameters of the spectrometer 10, for example by consideration of the duration and frequency range of the frequency sweep, how this maps onto the expected absorption features of the or more species to be detected, and on other factors, but typically the spectrometer 10 may be arranged such that the repetition rate of selecting the sample absorption volume is from about 50 to about 5000 times in a single frequency sweep. Typically, each reference volume may be selected once for every selection of the sample volume, although less frequent selection of reference volumes could be used.

The lower panel of FIG. 2 illustrates how the sample and reference segments illustrated in the middle panel contribute to an overall view of the infra red absorption spectra over the full frequency sweep in the sample volume 16 and in each of the reference volumes 18, marked respectively as S, R1 and R2 in this graph, by de-interleaving or demultiplexing of the different segment types. It can be seen here, for example, that the frequency sweep covers to infra red absorption lines, and the intensity of the absorption in the sample volume is intermediate between the intensity of absorption in each of the two reference volumes.

Although in the description of FIGS. 1 and 2 above a single sample volume and one or more reference volumes is presumed, the arrangement of FIG. 1 can instead be arranged such that two or more of the absorption volumes are sample volumes, each sample volume being used to analyse a different sample, and to this end, similar sample flow control apparatus 17 may be provided for each such sample volume, or a common sample flow control apparatus 17 used for all such sample volumes.

In this case, the middle panel of FIG. 2 would change such that during each switching cycle multiple sample volumes and one or more reference volumes are selected. Where the sequence of switching in FIG. 2 is shown as R1-S-R2-R1-S-R2, if two sample volumes S1 and S2 are now used the sequence of switching could be, for example, R1-S1-R2-S2-R1-S1-R2-S2. Of course different orderings could be used, any of the sample or reference volumes could be selected more or less frequently than others, and the switching cycle could vary over time.

If the analyser 26 therefore has access to sample segments of the detector signal which includes signal from two or more different sample volumes, this data can be used as discussed elsewhere in this document to separately detect one or more species in each of the sample volumes. These could be the same sample species for all sample volumes, or different species or combinations of species could be detected for each sample volume. The combinations of one or more reference volumes used for calibrating each of the multiple sample volumes could be same or different for each sample volume.

An arrangement where the spectrometer includes multiple sample volumes 16 could be used, for example, in process control where a different gas feed is obtained for analysis from different parts of a chemical process, or in an environmental monitoring system where different gas feeds are obtained from different parts of a building or different parts of an environment such as locations around a chimney stack or pipeline.

In calibrating the detection of a species in the sample volume 16 against known concentrations of the same species in each of one or more reference volumes 18, a single reference volume can provide a gain calibration, two reference volumes can provide a linear calibration, and three or more reference volumes can provide calibration accounting for non-linearities.

By way of example, assuming linearity of absorption as a function of species concentration (for example absorption less than about 10%) where a known concentration $L_R$ of a species in a reference volume gives rise to a particular level $R_p$ of the detector signal 24 in a reference segment corresponding to an absorption line i, this can be used to calibrate a level of the detector signal $S_i$ in a corresponding sample segment corresponding to the same absorption line i. If a suitable scaling factor F is presumed between variations in the detector signal and variations in the species concentration then the detected concentration in the sample volume may be determined and calibrated as:

$$L_S = L_R + F(S_i - R_i) \tag{1}$$

The scaling factor may be a single number, assuming an approximately linear relationship between detector signal and species concentration and no other relevant factors, or it may be a function of various parameters such as the detector signal from the sample volume and/or the reference volume, a detected temperature, and other factors.

When more than one reference volume is provided, with each such reference volume comprising at least one of the species to be detected at a zero or non-zero concentration different from such a concentration in one or more of the other reference volumes, then interpolation between (including extrapolation from) the detector signal 24 from two or more of the reference volumes may be used to calibrate a detected concentration of a species in the sample volume. For example, where concentrations of a species in reference volumes R1 and R2 of $L_{R1}$ and $L_{R2}$ give rise to levels of the detector signal at an absorption peak i of $R_{i1}$ and $R_{i2}$, the detected concentration in the sample volume may be determined and calibrated as:

$$L_S = L_{R1} + G(L_{R2} - L_{R1})(S_i - R_{i1})/(R_{i2} - R_{i1}) \tag{2}$$

Here, G is a scaling factor which takes a value one for a simple linear interpolation, but may be a more complex function for non-linear interpolations.

Such simple calibration calibrations can be made more complex, for example by assuming different offset and gain calibration factors for the segments from the sample and each of the reference volumes, using estimated or measured scaling factors and other functions for providing more accurate non-linear interpolations, and so forth. In the non-linear case a suitable relationship between Lr to Rp may need additionally to be used.

Because the spectrometer 10 discussed above provides rapid path switching between the multiple parallel absorption volumes, calibration of the detector signal from the sample volume using the detector signal from the one or more reference volumes, optionally as part of a calculation such as of species concentration as illustrated above, can be carried out using reference segments of the detector signal which are very close in time to the corresponding sample segments to be calibrated, and in particular which are from the same frequency sweep. Reference segments from other frequency sweeps may be excluded from the detection, determination or calibration process or step.

For example, if the repetition rate of switching to the sample volume is around 100 Hz then then a particular sample segment can be calibrated using one or more reference segments which are found in the detector signal within about +−0.01 seconds of the sample segment. In this way, the effects of drift in the laser source(s) 12, the absorption volumes 16, 18, the detector 22, and other components, and the effect of noise at frequencies of less than about 100 Hz, can be avoided and calibrated out of the detection results.

In particular, the detection of the one or more species using sample segments from a particular frequency sweep may be calibrated using only reference segments from the same frequency sweep.

Similarly, all of the reference segments to be used for calibration of a particular sample segment may be found adjacent to the sample segment in the sense that there are no intervening reference segments from the same absorption volumes. If this scheme is implemented then only segments for each reference volume which are immediately adjacent or closest to the sample segment are used. Optionally, just one reference segment from each reference volume may be used in calibration, or optionally one reference segment for each reference volume from each of before and after the sample segment, or optionally a limited number of contiguous reference segments for each reference volume where the sample segment is temporally within those contiguous reference segments, for example no more than four such contiguous reference segments from each reference volume.

In the particular calibration examples given above, it is effectively assumed that a magnitude or intensity of a particular spectral feature such as an absorption peak i can be determined from the detector signal at a time corresponding to that spectral feature, which can be found using a suitable calibration during a single frequency sweep. In practice, a particular target spectral feature will rarely be represented by a single detector signal sample segment and corresponding reference segments in a particular frequency sweep, so it is more practical to use at least a basic curve fitting process to measure a target spectral feature, or more preferably using a spectral model which defines the expected spectra across some or all of the frequency sweep and uses fitting techniques to derive parameters of the one or more species giving rise to those spectra, in particular the concentrations or relative concentrations of those species.

When using a spectral model to fit for the species concentrations, it may be desirable to first calibrate each sample segment from the detector signal using adjacent or proximal reference segments from the same frequency sweep as discussed above, before using the calibrated sample segments within the spectral model, or it may be desirable to include the calibration process using the reference segments as part of the model fitting process.

A more specific example of handling the detector signal to recover molecular concentration of the one or more species using such a spectral modelling approach is now presented. As illustrated in the lower panel of FIG. 2, the segments of the detector signal for a particular frequency sweep represent transmission (absorption) spectra from the sample volume and each of the reference volumes. These can be referred to as transmission spectra $S_s(v)$ as a function of frequency v using a calibration of the frequency sweep, taken from the sample segments, and $S_{R1}(v), \ldots, S_{RN}(v)$ for the N reference volumes recorded from the same frequency sweep. From this set, N-1 relative normalized transmission spectra can then be calculated:

$$t_k(v) = (S_S(v) - S_{Rk}(v))/S_{Rk}(v), \text{ with } k=1 \text{ to } N \quad (3)$$

This operation cancels common noise between the signal from the sample volume and the signal from the reference volumes, and calibrates the absorption spectra into relative absorption units, hence suppressing laser baseline and other effects.

The next step consists in recovering the molecular number densities from the $t_k(v)$ data. To do this a mathematical model of the absorption spectra expected based on the available parameters and target species is constructed, which synthesises the expected absorption spectra determined as above using the analyser 26 from the detector signal.

A first part of the model calculates expected transmission of the probe light from the laser source(s) 12 through the absorption volumes. Individual molecular absorption lines can be selected from a molecular spectroscopy database such as HITRAN (https://www.cfa.harvard.edu/hitran/). With the molecular absorption parameters to hand, an absorption profile for each resonance can be calculated using a commonly used profile function (for instance the Voigt profile function can be used). This requires knowledge of pressure and temperature in the absorption volumes. After this step, the molecular absorption coefficient is calculated.

Then, using the Beer Lambert law, the expected absorption or transmission of the probe light through each absorption volume as a function of frequency can be calculated. This requires the knowledge of molecular concentration and interaction length between the probe light and the molecular gas. Once synthetic transmission spectra through the sample and reference volumes have been derived, the relative normalized transmission signals defined by equation 3 above can be calculated to yield a model of the expected transmission spectra.

The above model can then be used to retrieve unknown parameters (such as the molecular concentration of a target species in the sample volume) using a locally linear fitting routine, such as Levenberg-Marquardt. In this way, unknown parameters are gradually altered in the model to minimize the root mean squared difference between the normalised transmission spectra and the model. In addition, such a model allows the calculation of noise propagation to determine estimates of the uncertainty on the retrieved parameters.

It was mentioned above that the spectrometer may be used to determined concentrations of two or more species such as $^{12}CO_2$ and $^{13}CO_2$. These particular species may for example be used in applications as diverse as clinical diagnostics such as non-invasive breath diagnostics including monitoring the activity of bacteria in the stomach, and in monitoring volcanic emissions. Some other suitable target species for detection using embodiments of the present invention include other isotopologues such as $^{16}O^{12}C^{18}O$, $H^{35}Cl$, $H^{37}Cl$, $^{12}CH_4$ $^{13}CH_4$, $^{12}CH_3D$, $^{14}N_2$ $^{16}O$, $^{14}N^{15}N^{16}O$, $^{14}N^{15}N^{16}O$, other molecules such as $CH_4$, hydrocarbons, atmospheric trace molecules, and greenhouse gases.

Although particular embodiments of the invention have been described above, it will be apparent to the skilled person that a variety of modifications and alternatives may be implemented without departing from the scope of the invention. For example, although spectral features in the infra red are discussed in detail, this may include features in the near infra red, and in other spectral regions such as the visible band could be used. Spectral features to be detected may particularly by ro-vibrational features, but other spectral features arising from other transition types such as atomic transitions may also or instead be detected.

The absorption volumes discussed above may also be varied and adapted in various ways familiar to the skilled person, for example by using multi-pass absorption cells.

The invention claimed is:

1. A method of detecting at least first and second species in a sample, comprising:
generating probe light using a single laser source such that the probe light completes one or more frequency sweeps, each frequency sweep being across at least one infra red absorption spectrum feature of each of the at least first and second species;
providing a plurality of absorption volumes, comprising a sample volume containing said sample, and two or more reference volumes containing known concentrations of said at least first and second species, wherein each reference volume contains a known concentration of at least one of the at least first and second species, which may be a zero concentration, which is different to the known concentration of that species in each of the other reference volumes;
directing said probe light from the laser source along a path to a single detector element to output a detector signal from the single detector element, wherein the complete path from the laser source to the single detector element passes through only one of the absorption volumes at any one time;
switching the path to the single detector element to sequentially select each of the absorption volumes a plurality of times during each frequency sweep, so that the detector signal for a particular frequency sweep comprises a plurality of sample segments when the path comprises the sample volume, and a plurality of reference segments when the path comprises a reference volume, and such that the sample segments comprise segments representing the at least one infra red absorption feature of the first species and segments representing the at least one infra red absorption feature of the second species;
detecting the at least first and second species from the sample segments representing the infra red absorption features of the first species and the sample segments representing the infra red absorption features of the second species, including calibration using the reference segments.

2. The method of claim 1 wherein the step of detecting comprises determining concentrations of both the first and second species calibrated against known concentrations of the first and second species in each of the one or more reference volumes.

3. The method of claim 2 wherein the first and second species are isotopologues of the same molecule, and the step of determining concentrations of both the first and second species comprises determining an isotopic ratio of the first and second species.

4. The method of claim 1 wherein the step of detecting the at least first and second species from the sample segments comprises calibrating sample segments from a particular frequency sweep using only reference segments from the same frequency sweep.

5. The method of claim 1 wherein the step of detecting the at least first and second species from the sample segments comprises calibrating sample segments using only those reference segments which are proximal or adjacent in the detector signal to the sample segment to be calibrated.

6. The method of claim 1 wherein the step of detecting the at least first and second species comprises calibrating the detector signal from the sample volume using an interpolation between and/or an extrapolation from the detector signal from each of the reference volumes.

7. The method of claim 1 wherein the path is switched such that the sample volume is selected at a repetition rate of at least 50 Hz.

8. The method of claim 1 wherein the path is switched to select each reference volume at the same repetition rate as the sample volume.

9. The method of claim 1 wherein the path is switched using a micro machined electro mechanical optical switch.

10. The method of claim 1 wherein the plurality of absorption volumes comprises a plurality of sample volumes, each containing a different sample, such that that the sample segments comprise sample segments from each of the different sample volumes, and the step of detecting comprises separately detecting any of the at least first and second species from the sample segments from each of the sample volumes, including calibration using the reference segments.

11. A spectrometer for detecting at least first and second species in a sample, comprising:
a single laser source for generating probe light such that the probe light completes one or more frequency sweeps, each frequency sweep being across at least one infra red absorption spectrum feature of each of the at least first and second species;
a plurality of absorption volumes, comprising a sample volume containing said sample, and two or more reference volumes containing known concentrations of said at least first and second species, wherein each reference volume contains a known concentration of at least one of the at least first and second species, which may be a zero concentration, which is different to the known concentration of that species in each of the other reference volumes;
a single optical detector element arranged to output a detection signal;
path optics arranged to direct said probe light along an optical path to the single optical detector element which includes only one of the absorption volumes at any one time, and to switch the optical path to sequentially select each of the absorption volumes a plurality of times during each frequency sweep, so that the detector signal for each frequency sweep comprises a plurality of sample segments when the path comprises the sample volume, and a plurality of reference segments when the path comprises a reference volume, the sample segments comprising segments representing the at least one infra red absorption feature of the first species and segments representing the at least one infra red absorption feature of the second species;
an analyser arranged to calibrate each of a plurality of the sample segments using corresponding one or more reference segments, and to detect said first and second species from the calibrated sample segments representing the at least one infra red absorption feature of the first species and the calibrated sample segments representing the at least one infra red absorption feature of the second species.

12. The spectrometer of claim 11 wherein the analyser is arranged to determine concentrations of both the first and second species calibrated against known concentrations of the first and second species in each of the one or more reference volumes.

13. The spectrometer of claim 12 wherein the first and second species are isotopologues of the same molecule, and the analyser is arranged to determine an isotopic ratio of the first and second species.

14. The spectrometer of claim 11 wherein the analyser is arranged to calibrate sample segments from a particular frequency sweep using only reference segments from the same frequency sweep.

15. The spectrometer of claim 11 wherein the analyser is arranged to calibrate sample segments using only those reference segments which are proximal or adjacent in the detector signal to the sample segment to be calibrated.

16. The spectrometer of claim 11 wherein the analyser is arranged to calibrate the sample segments by interpolation between and/or extrapolation from the reference segments of each of the two or more reference volumes.

17. The spectrometer of claim 11 arranged so that the path is switched to select the sample volume at a repetition rate of at least 50 Hz.

18. The spectrometer of claim 11 arranged such that the path is switched to select each reference volume at the same repetition rate as for the sample volume.

19. The spectrometer of claim 11 wherein the path optics comprise a micro machined electro mechanical optical switch arranged to switch the path to sequentially select each of the absorption volumes a plurality of times during each frequency sweep.

20. The spectrometer of claim 11 wherein the optical detector is a single detector element outputting a single detector signal divisible into a sequence of contiguous sample and reference segments.

21. The spectrometer of claim 20 wherein the single detector element comprises a single semiconductor substrate.

22. The spectrometer of claim 11 wherein the plurality of absorption volumes comprises a plurality of sample volumes each containing a different sample, such that the sample segments comprise sample segments from each of the different sample volumes, and the analyser is arranged to separately calibrate sample segments from each of the sample volumes, and to detect said at least first and second species in each of the sample volumes from the calibrated sample segments.

* * * * *